United States Patent [19]

Antesberger

[11] Patent Number: 5,369,276
[45] Date of Patent: Nov. 29, 1994

[54] METHOD AND SYSTEM FOR REAL-TIME WAVELENGTH IDENTIFICATION FOR INFRARED DETECTORS

[75] Inventor: A. Wayne Antesberger, Woodbridge, Va.

[73] Assignee: The United States of America as represented by the Secretary of the Army, Washington, D.C.

[21] Appl. No.: 907,099

[22] Filed: Jul. 1, 1992

[51] Int. Cl.⁵ .............................................. G01J 3/18
[52] U.S. Cl. ................... 250/334; 250/339.01; 250/370.06
[58] Field of Search ............... 250/334, 332, 330, 339, 250/370.06

[56] References Cited

U.S. PATENT DOCUMENTS

| | | | |
|---|---|---|---|
| 4,497,540 | 2/1985 | Breckinridge et al. | 356/330 |
| 4,650,321 | 3/1987 | Thompson | 356/328 |
| 4,678,332 | 7/1987 | Rock et al. | 356/328 |
| 4,917,492 | 4/1990 | Koishi | 356/328 |
| 4,939,368 | 7/1990 | Brown | 250/231.1 |
| 5,149,959 | 9/1992 | Collins et al. | 250/339 |
| 5,159,199 | 10/1992 | LaBaw | 250/339 |

Primary Examiner—Carolyn E. Fields
Attorney, Agent, or Firm—Milton W. Lee; Alain L. Bashore; Anthony T. Lane

[57] ABSTRACT

A real-time wavelength detection system having an infrared detector responsive to focused input radiation indicative of a source image over a given frequency range. Diffraction means positioned on a detector surface window obtaining a diffraction pattern of the focused radiation. Output means provide an output of the image and diffraction pattern. The diffraction pattern is used for determining a discrete wavelength for the given frequency range of the source detected, without substantial impairment of system imagery.

2 Claims, 6 Drawing Sheets

METHOD AND SYSTEM FOR REAL-TIME WAVELENGTH IDENTIFICATION FOR INFRARED DETECTORS

BACKGROUND OF THE INVENTION

1. Field of the Invention

The present invention generally relates to infrared detection and more specifically, to real-time wavelength identification utilizing infrared detectors.

2. Description of Prior Art

The capability to identify wavelengths in real time utilizing a thermal viewer or detection device responsive to input radiation over its entire frequency range is not presently available. Such devices presently require the use of optical filters such as disclosed in U.S. Pat. Nos. 4,280,050 and 4,363,967. The use of such methods requires knowledge of each specific wavelength of interest with coincidence detection and also is not in real-time. The identification of unknown sources in real-time is of great importance in many instances since it is important to know the surrounding environment of the source.

While the prior art has reported using identification methods none have established a basis for a specific apparatus that is dedicated to the task of resolving the particular problem at hand. What is needed in this instance is the capability to identify wavelengths in real-time utilizing a thermal viewer or detection device responsive to input radiation over its entire frequency range whereby infrared detector system imagery is substantially unimpaired.

SUMMARY OF THE INVENTION

It is therefore one object of the present invention to provide the capability to identify a wavelength of a source in real-time by utilizing a thermal viewer or detection device responsive to input radiation over its entire frequency range whereby infrared detector system imagery is substantially unimpaired.

Referring to the invention, there is disclosed detecting input radiation utilizing a thermal viewer or detection device and obtaining a diffraction pattern of a detected source. The diffraction pattern is obtained in real-time and the source may be either a broadband or monochromatic source. The diffraction pattern is used to determine a discrete wavelength of the detected source utilizing a thermal viewer or detection device responsive to input radiation over its entire frequency range.

BRIEF DESCRIPTION OF THE DRAWINGS

The foregoing and other objects, aspects and advantages will be better understood from the following detailed description of a preferred embodiment of the invention with reference to the drawings, in which:

FIG. 1b is a pictorial view of the infrared (IR) imager assembly of FIG. 1a.

DETAILED DESCRIPTION OF A PREFERRED EMBODIMENT OF THE INVENTION

Figure 1A:
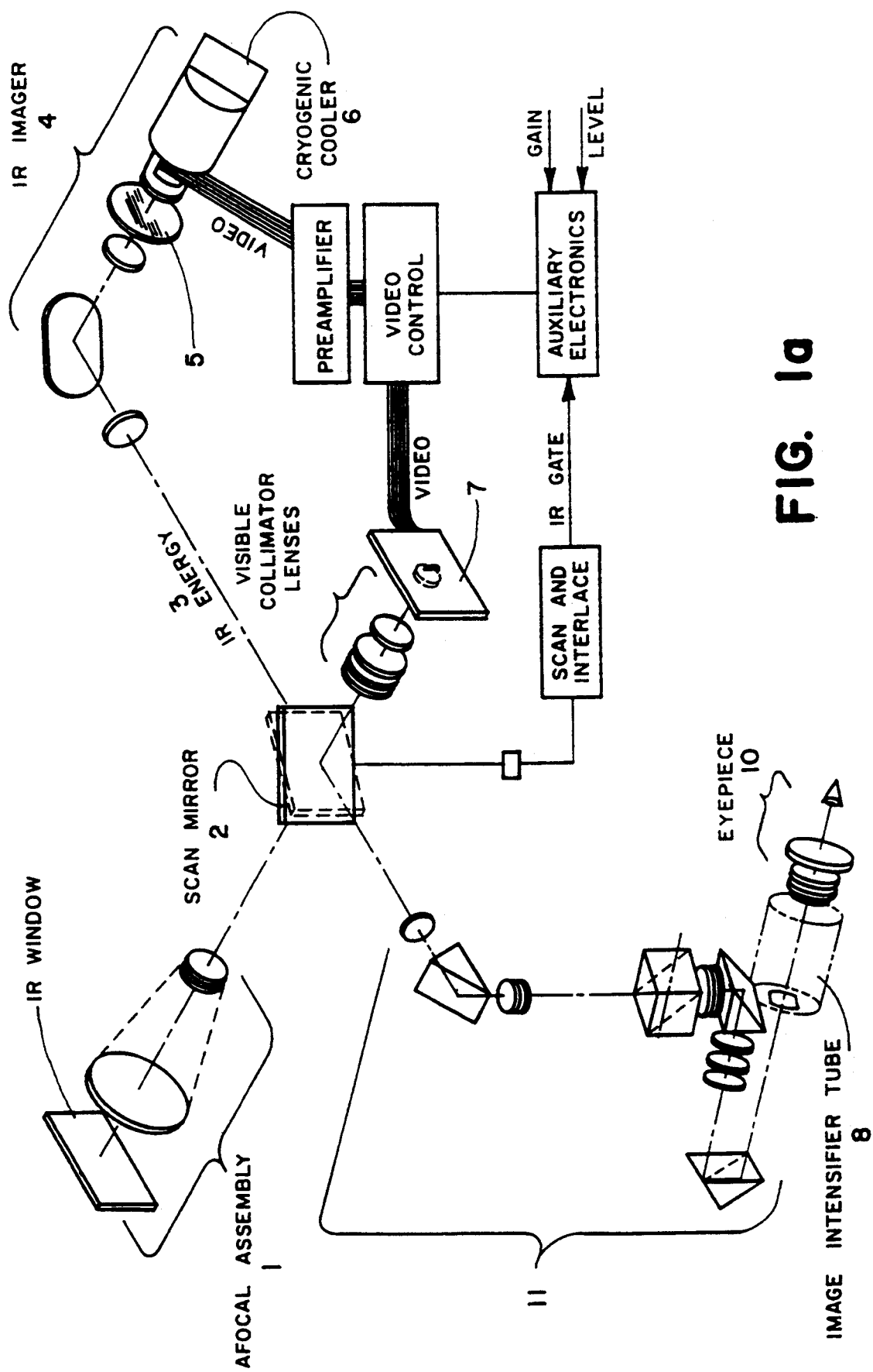
FIG. 1a is a pictorial view of the overall embodiment.
Figure 1B:
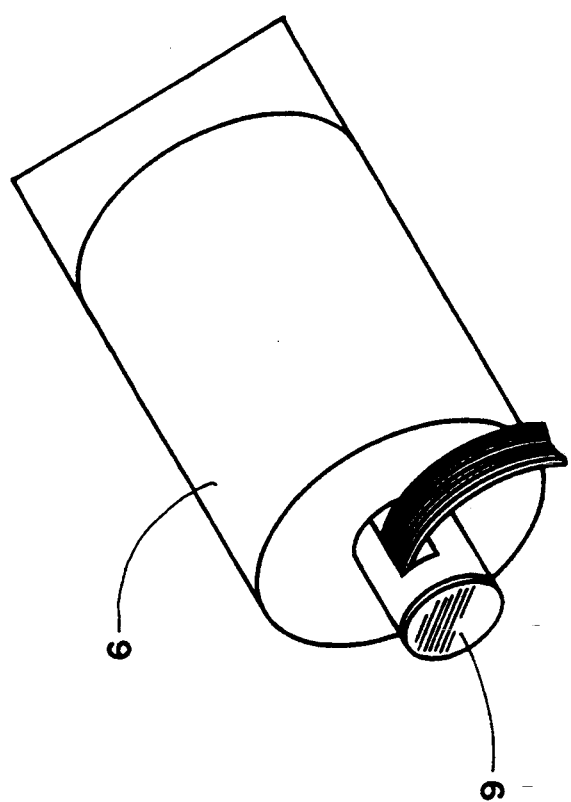

Referring now to the drawings, and more particularly to FIG. 1a, there is shown in pictorial view the basic components of a scanning Forward Looking Infrared (FLIR) detector with real-time wavelength detection means. Afocal assembly 1, shown in exploded view, collects and focusses a radiation pattern from a scene onto an afocal plane. Scan mirror 2 directionally sweeps the scene along optical path 3 to IR imager 4 assembly, shown in exploded view, which includes diffraction means 5 and cooler 6. Diffraction means 5 creates a diffraction pattern in a dimension across the detection surface. It is understood that the diffraction pattern must cover as much of the detection surface as possible. By placing the diffraction means in the optical path a real-time diffraction pattern is obtained. The diffraction pattern is used to determine a discrete wavelength by conventional means for the entire frequency range of the source detected, without substantial impairment of system imagery. Imager 4 converts the radiant signal to an electrical signal. This electrical signal is reconverted to an optical signal on video display 7. Conventional means known in the art, utilizing computer algorithms allow for subtracting out the fields for image and a diffraction pattern or patterns. Image intensifier tube 8 gives a viewer looking through eyepiece assembly 10 and associated optics assembly 11, both shown in exploded view, the fringe frequency scene which could include the diffraction pattern and/or its analysis. It is understood that the invention is not limited to the preferred embodiment shown but may be utilized with any FLIR, staring or scanning device. FIG. 1b depicts diffraction means 5 of FIG. 1a on detector surface window 9 of FIG. 1b.

FIGS. 2 through 5 are results of the following test of the present embodiment utilizing the U.S. Army's deployed Thermal Sight (AN VSG-2) system which is responsive to the 8 to 12 micro-meter wavelength region. A diffraction grating consisting of a germanium window with a laminated polymer was used with spacing for the grating at 56 micro-meters. The physical relationship between the grating and the detection surface must be considered for optimum grating spacing. It is understood that the invention is not limited to the specific grating spacing of the grating of the preferred embodiment but will vary depending on its distance from the detector surface. The diffraction grating was manufactured by RALCON, Inc.; 8501 South 400 West; Box 142; Paradise, Utah 84328. The grating was inserted in front of the objective lens of a scanning FLIR.

Figure 2:
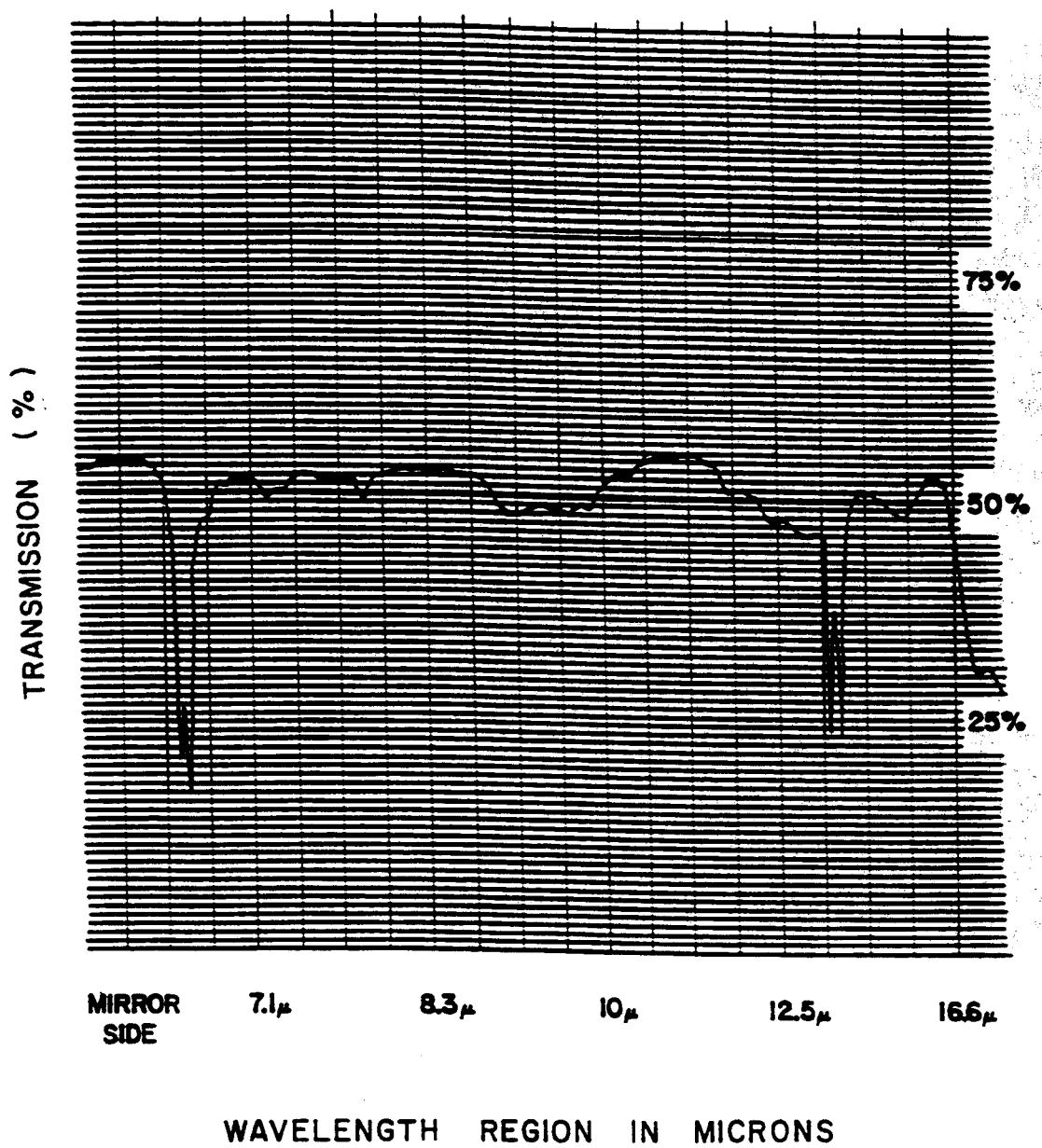
FIG. 2 is a spectral transmission curve for the grating.
Figure 3:
FIG. 3 is an wide field of view image result.
Figure 4:
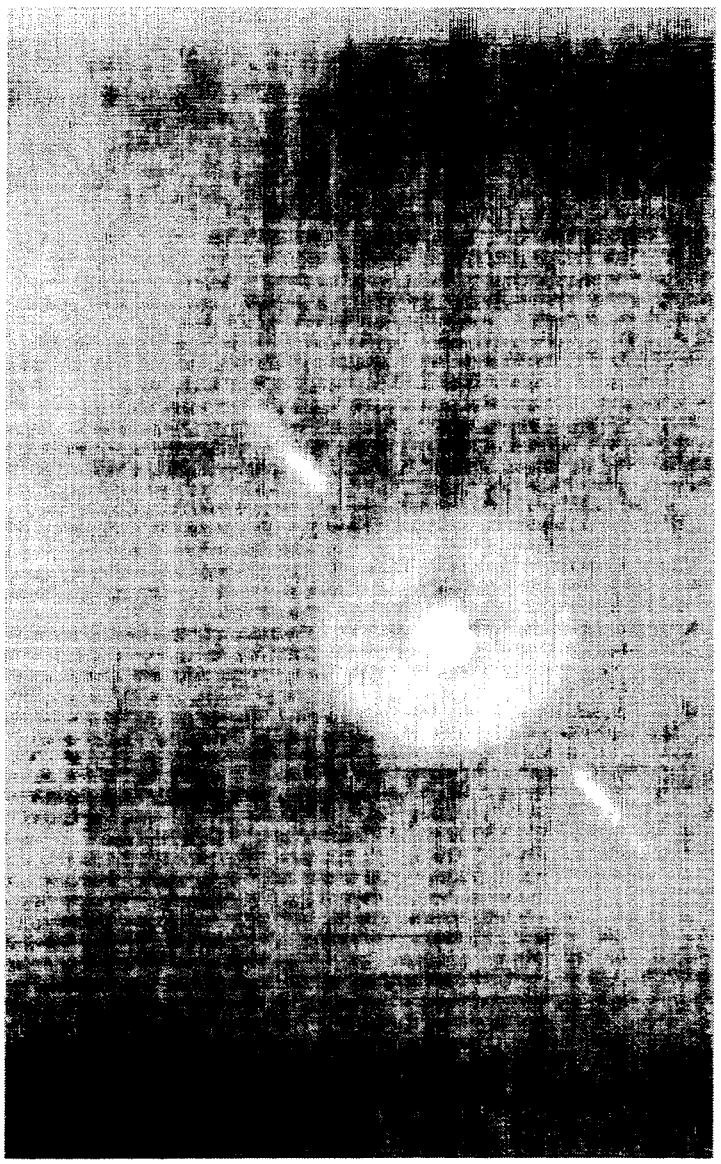
FIG. 4 is an image result of a broadband source.
Figure 5:
FIG. 5 is an image result of a monochromatic source.

FIG. 2 is the spectral transmission curve of the diffraction grating run on a PERKIN-ELMER 983 which shows an overall transmission of nominally 50% and is reasonably constant over the 8-12 micro-meter region. FIG. 3 is a wide field of view image utilizing the present invention. From FIG. 3 it can be seen that the system is unaffected by "ghost" images and that irradiance from a source tends to illuminate the detectors as the different orders become visible. FIG. 4 is the image result of a blackbody as a broadband source and FIG. 5 is the image result of a 10.6$\mu$ $CO_2$ Laser as a monochromatic source.

While this invention has been described in terms of preferred embodiment consisting of the specific diffraction means and system utilized, those skilled in the art will recognize that the invention can be practiced with modification within the spirit and scope of the appended claims.

Having thus described my invention, what I claim as new and desire to secure by Letters Patent is as follows:

1. A real-time wavelength detection system having an infrared detector responsive to focused input radiation indicative of a source image over a given frequency range further including:

diffraction means positioned on a detector surface window for obtaining a diffraction pattern of the focused radiation;

output means for providing an output of the image and diffraction pattern whereby the diffraction pattern is used for determining a discrete wavelength for the given frequency range of the source detected, without substantial impairment of system imagery.

2. The system of claim 1 wherein the diffraction means includes a diffraction grating with a grating spacing of 56 micrometers.

* * * * *